(12) United States Patent
Moretti et al.

(10) Patent No.: US 12,552,473 B2
(45) Date of Patent: Feb. 17, 2026

(54) CHAIN PIN ASSEMBLY

(71) Applicant: ITALTRACTOR ITM S.P.A., Valsamoggia (IT)

(72) Inventors: Nicolas Moretti, Verghereto (IT); Eustachio Calia, Matera (IT)

(73) Assignee: ITALTRACTOR ITM S.P.A., Valsamoggia (IT)

( * ) Notice: Subject to any disclaimer, the term of this patent is extended or adjusted under 35 U.S.C. 154(b) by 471 days.

(21) Appl. No.: 17/928,179

(22) PCT Filed: May 14, 2021

(86) PCT No.: PCT/IB2021/054133
§ 371 (c)(1),
(2) Date: Nov. 28, 2022

(87) PCT Pub. No.: WO2021/240288
PCT Pub. Date: Dec. 2, 2021

(65) Prior Publication Data
US 2023/0211839 A1 Jul. 6, 2023

(30) Foreign Application Priority Data
May 26, 2020 (IT) .......................... 102020000012427

(51) Int. Cl.
*B62D 55/21* (2006.01)
*F16G 13/06* (2006.01)
*G01K 1/143* (2021.01)

(52) U.S. Cl.
CPC .......... *B62D 55/211* (2013.01); *B62D 55/213* (2013.01); *F16G 13/06* (2013.01); *G01K 1/143* (2013.01)

(58) Field of Classification Search
CPC ..... B62D 55/211; B62D 55/213; F16G 13/06; G01K 1/143
See application file for complete search history.

(56) References Cited

U.S. PATENT DOCUMENTS 10,401,315 B2 * 9/2019 Baarman ................ H10N 10/17

FOREIGN PATENT DOCUMENTS

| EP | 3144560 A1 | * | 3/2017 | |
| ES | 2901218 T3 | * | 3/2022 | ............ B21C 51/00 |
| WO | 2019081698 A1 | | 5/2019 | |

OTHER PUBLICATIONS

International Search Report and Written Opinion of the International Searching Authority issued in International Application No. PCT/IB2021/054133, issued Aug. 16, 2021, 13 pages.

\* cited by examiner

*Primary Examiner* — Steven Lim
*Assistant Examiner* — James E Munion
(74) *Attorney, Agent, or Firm* — DILWORTH IP, LLC

(57) ABSTRACT

A track pin assembly includes a pin having a first axial end and a second axial end configured to engage a respective outer link of a joint, a first cavity which defines a tank for containing lubricating oil or grease, and a second cavity arranged at the second axial end of the pin and open at the second axial end of the pin. A sensor, arranged in the second cavity, includes a sensor element configured to measure a temperature and to generate a signal indicative of the measured temperature, and a transmitter configured to irradiate a measuring signal that is representative of the signal generated by the sensor element. A power source, arranged in the second cavity, is configured to constantly supply the sensor.

15 Claims, 5 Drawing Sheets

CHAIN PIN ASSEMBLY

FIELD OF THE INVENTION

The present invention relates to a track pin assembly for a work machine such as an earth moving machine, a mining machine, a demolition machine and the like.

BACKGROUND

Such types of machines are usually installed on movement structures known as undercarriages to allow the machine to move on ground that is often uneven or loose.

An undercarriage typically comprises two chain assemblies distanced from one another and arranged parallel to form two tracks, configured to receive a torque and transfer it to the ground.

Each chain assembly comprises a closed loop track chain on a sprocket and an idler operatively connected to a tensioning unit. The undercarriage components further comprise, between the sprocket and the idler, a plurality of rollers configured to guide the track chain during the motion thereof and to absorb the loads transmitted by the machine.

The track chain usually comprises a plurality of joints rotatably connected to each other at respective ends. Each joint comprises a pair of links facing each other. The links of each joint are usually interconnected by pins and bushings. Each pin is usually inserted in holes provided on the links to connect two links together. The bushings are usually placed radially outside the pins to distance the links of the joints from one another, protecting the pins from the external environment and to mesh the sprocket. The shoes are usually mounted on the joints which, being in direct contact with the ground, have the task of discharging the traction to the ground and increasing the contact surface between machine and ground. The type of shoe used depends on the ground on which the machine must operate, on the conditions of the environment in which the machine must operate and on the specifications suggested by the machine manufacturer.

The chain assembly is usually subjected to very demanding operating conditions, both due to the total weight of the machine, and the high power transferred by the machine engine to the ground, and the conformation and composition of the ground on which the machine is to operate.

The components of the chain assembly are therefore subjected to high mechanical stress that can cause damage to the components themselves.

In order to prevent or delay damage to the components of the chain assembly, a lubrication system has been developed between the pin and the bushing. Such a lubrication system provides that the pin comprises an inner axial cavity coaxial with the axis of symmetry of the pin, which forms a tank, and an inner radial cavity which connects the tank with the outer surface of the pin. An annular chamber is obtained between the outer surface of the pin and the bushing, and a hydraulic sealing system is provided between the bushing and the links. The tank inside the pin is filled with lubricating oil or grease which, through the inner radial cavity of the pin, reaches the annular chamber, lubricating the interface between pin and bushing.

Although the lubrication system briefly described above results in less pin wear and a longer service life for the chain assembly, the chain assembly is not free from possible damage.

Possible damage requires machine downtime for performing repair interventions or the replacement of components to restore the correct operation of the machine.

The Applicant has verified that the correct planning of machine downtime enables the optimization of the performance of the machine in terms of production. In particular, the Applicant has verified that to optimize the production performance of the work machine, the latter should be stopped and subjected to repair interventions or the replacement of components before any damage of a component causes other components to break down with a consequent forced and sudden stop of the machine and long restoration times.

The Applicant has also verified that, at the same time, the optimization of the production performance of the work machine cannot anticipate periodic machine downtime for the replacement of components that are not effectively compromised or close to effective breakdown, as the total machine downtimes would be unjustifiably long.

U.S. Pat. No. 10,401,315B1 describes a track pin system in which a sensor which includes a temperature-sensitive element and a transmitter is provided inside the tank obtained in the pin. The sensor and the circuitry necessary for detecting and transmitting the detected data is supplied by a thermoelectric generator also contained in the pin tank and capable of generating electrical energy when the temperature of the oil in the tank exceeds a safety limit. Therefore, the sensor measures and sends the measurement when the oil temperature inside the tank reaches a critical temperature indicative of a malfunction or impending breakdown of the pin and bushing assembly.

The Applicant believes that the system described in U.S. Pat. No. 10,401,315B1 can be used to plan downtime by acting on the chain assembly when the sensor is triggered by an overly high temperature of the oil inside the pin tank.

However, the Applicant considers that it would be important to have a track pin assembly which would allow indicative parameters of the operation of the chain assembly to be determined not only in the event of impending breakdown or malfunction.

In the Applicant's experience it would be important to determine indicative parameters of the operation of the chain assembly during normal machine operation in order to ascertain the actual correct operation thereof moment by moment, periodically or occasionally.

In fact, the Applicant considers that this knowledge could prevent possible breakdowns, for example by temporarily stopping the machine when a parameter deviates from an optimal value without being indicative of an ongoing malfunction.

The Applicant further believes that this knowledge could allow the processing of parameters indicative of the operation of the chain assembly to try to predetermine times or conditions at which a breakdown or malfunction may be likely.

The Applicant has further perceived that it would be advantageous to have a track pin assembly in which the parameters indicative of the operation of the chain assembly are available in a fail-safe mode, i.e., where a malfunction or failure in the availability of such parameters does not affect proper machine operation.

SUMMARY

The present invention therefore relates to a track pin assembly comprising:
a pin comprising a first axial end and a second axial end configured to engage a respective outer link of a joint,
a first cavity which defines a tank for containing lubricating oil or grease, a second cavity arranged at the second axial end of the pin and open at the second axial end of the pin;

a sensor placed in the second cavity and comprising a sensor element, configured to measure a temperature and to generate a signal indicative of the measured temperature, and a transmitter configured to irradiate a measuring signal that is representative of the signal generated by the sensor element;

a power source configured to constantly supply the sensor and placed in the second cavity.

The first cavity acts as a tank and, by containing lubricating oil or grease, allows the lubrication of part of the chain assembly. Lubricating oil or grease can reach high operating temperatures, e.g., about 90° C. or more. An increase in the temperature of the lubricating oil or grease above a certain threshold, e.g., about 100° C., may indicate an abnormal operation of the chain assembly.

The second cavity is configured to allow the use of a pin centering tool during insertion on the joint. The pin can engage the axially outer joint of the track chain by mechanical interference, preventing the pin from rotating with respect to the axially outer joint. Such a coupling by mechanical interference is usually performed using a press which pushes the pin in an axial direction into a hole in the link (or pushes the link outward to receive the pin in the hole). During this operation, the pin is centered with respect to the hole in the link using a centering tool which inserts at least partially into the second cavity of the pin.

The Applicant has noted that the second cavity is no longer substantially used once the pin has been coupled to the links.

The Applicant has perceived that the second cavity can be used to house a sensor and an energy source capable of supplying the sensor, so as to detect the temperature of the pin.

The Applicant has perceived that although the temperature detected by the sensor is not the temperature of the lubricating oil or grease in the first cavity (whose actual temperature is, as said, an indication of correct chain assembly operation), the temperature detected in the second cavity is directly proportional to the temperature of the lubricating oil or grease in the first cavity.

Indeed, the Applicant has noted that the pins are made of metallic material, typically steel, and are therefore made of a thermally conductive material.

By monitoring the temperature of the pin at the second cavity, it is therefore possible to monitor the operating status of the joint.

The Applicant has also perceived that by placing the sensor and the power source in the second cavity, both the sensor and the power source do not need to be operated in a hot oil bath, allowing for an easier implementation thereof.

The sensor and the power source can also be chosen so as to ensure that an emission of measuring signals that are representative of the signal generated by the sensor element is independent of the actual temperature of the pin, i.e., even when the pin temperature is low or below a predetermined threshold.

Thereby, the pin temperature can be monitored at any periodicity, allowing monitoring the actual operation of the track pin assembly and thus of the chain assembly.

Furthermore, the failed emission of the measuring signals that are representative of the signal generated by the sensor element is directly attributable to a sensor malfunction, allowing the sensor to be serviced (e.g., by replacement or repair).

Therefore, in the event of a sensor breakdown, the track pin assembly behaves in fail-safe mode, i.e., a sensor malfunction does not affect the correct operation of the machine because it is immediately identifiable.

The Applicant has further perceived that by arranging the sensor and the power source in the second cavity which, as said, is in any case present in the pin to allow the assembly thereof on the joint, it is not necessary to make special cavities in the pin configured to receive the sensor and the power source. In fact, further cavities made in the pin could weaken the structure of the pin which, by the nature thereof, is subject to high stresses during normal use.

The terms "axial", "axially", "radial" and "radially", are used with reference to the pin when associated to the joint.

In particular, the terms "axial" and "axially" are meant as references/sizes arranged/measured or extending in a substantially parallel direction to the extension axis of the pin.

The terms "radial" and "radially" mean references/sizes arranged/measured or extending in a substantially perpendicular direction to the extension axis of the pin and lying in a perpendicular plane to such extension axis.

The terms "radially inner/outer" mean respectively a position closer to or further away from the aforesaid extension axis of the pin.

The terms "radially inner/outer" mean respectively a position closer to or further away from a radial plane passing through a barycentric point of the pin.

The present invention can comprise at least one of the preferred features described below.

Preferably, the track pin assembly comprises a centering ring arranged in the second cavity in an outer axial position with respect to the sensor and the power source. Preferably, the centering ring decreases the radial dimension of the second cavity at the second axial end of the pin.

The centering ring allows to bring the inlet diameter of the second cavity to the diameter of the centering tool should it be necessary to increase the diameter of the second cavity to better house the sensor and power source.

The centering ring has an inner diameter preferably between about 20 millimeters and about 10 millimeters, more preferably 15 millimeters. The outer diameter of the centering ring is preferably the same as or slightly larger than the inner diameter of the second cavity at the second axial end of the pin.

Preferably, there is a shoulder in the second cavity which is configured to receive the centering ring in abutment.

The shoulder defines an end stop for the insertion of the centering ring so as to define the degree of penetration in the axial direction of the centering ring inside the second cavity.

Preferably, the axial distance of the shoulder from the second axial end of the pin is equal to or greater than the dimension in the axial direction of the centering ring.

Preferably, the extension in the axial direction of the second cavity is less than the extension in the axial direction of the first cavity.

Preferably, the extension in the axial direction of the second cavity is between 0.05 and 0.5 times the extension in the axial direction of the first cavity.

More preferably, the extension in the axial direction of the second cavity is between 0.05 and 0.2 times the extension in the axial direction of the first cavity, e.g., it is about 0.09 times the extension in the axial direction of the first cavity.

Preferably, the transmitter comprises an antenna completely arranged inside the second cavity.

The Applicant has verified that by arranging the antenna completely inside the second cavity, the transmission of the antenna can be partially shield with possible loss of some irradiated measuring signals.

However, since the transmitter is constantly supplied by the power source, the possible loss of some measuring signals irradiated by the antenna does not affect the temperature monitoring of the pin, since the loss of one or more measuring signals is largely compensated by the reception of the other measuring signals irradiated by the antenna.

The Applicant has found that by appropriately choosing the emission time frequency of the measuring signals it is possible to make the effect due to the loss of some measuring signals negligible.

The antenna being completely arranged inside the second cavity means that there are no parts of the sensor exposed to possible shock and damage during the operation of the track pin assembly.

Preferably, the sensor comprises a sensor electronic module operatively connected to the sensor element and to the transmitter to process the signals indicative of the temperature measured by the sensor element and to generate the measuring signals.

Preferably, the sensor electronic module is arranged inside the second cavity and is supplied by said power source.

Thereby, the sensor electronic module is not exposed to possible shock and damage during the operation of the track pin assembly.

Preferably, the sensor electronic module is configured to generate the measuring signals at predetermined time intervals.

Preferably, the measuring signals are generated in a time interval (i.e., the emission time frequency of the measuring signals is) between 1 generation of measuring signals every 0.5 seconds and 1 generation of measuring signals every 10 minutes, more preferably between 1 generation of measuring signals every 1 second and 1 generation of measuring signals every 8 minutes, more preferably between 1 generation of measuring signals every 2 seconds and 1 generation of measuring signals every 5 minutes, more preferably between 1 generation of measuring signals every 3 seconds and 1 generation of measuring signals every 3 minutes, more preferably between 1 generation of measuring signals every 5 seconds and 1 generation of measuring signals every 2 minutes, more preferably between 1 generation of measuring signals every 5 seconds and 1 generation of measuring signals every 30 seconds.

Preferably, the sensor electronic module is configured to process the signals indicative of the temperature measured by the sensor element at predetermined time intervals.

The Applicant has found that it is not necessary for the signals indicative of the temperature measured by the sensor element to be processed with the same frequency with which the measuring signals are generated.

Preferably, the signals indicative of the temperature measured by the sensor element are processed at a lower time frequency with respect to the time frequency at which the measuring signals are generated.

In this case, the measuring signals will be indicative of the last processing of the signals indicative of the temperature measured by the sensor element.

Preferably, the signals indicative of the temperature measured by the sensor element are processed in a time interval (i.e., the processing time frequency of the signals indicative of the measured temperature is) between 1 generation of measuring signals every 2 seconds and 1 generation of measuring signals every 10 minutes, more preferably between 1 generation of measuring signals every 10 seconds and 1 generation of measuring signals every 8 minutes, more preferably between 1 generation of measuring signals every 20 seconds and 1 generation of measuring signals every 5 minutes, more preferably between 1 generation of measuring signals every 30 seconds and 1 generation of measuring signals every 3 minutes, more preferably between 1 generation of measuring signals every 40 seconds and 1 generation of measuring signals every 2 minutes, more preferably between 1 generation of measuring signals every 50 seconds and 1 generation of measuring signals every 1.5 minutes.

Preferably, the sensor electronic module comprises a memory module configured to store the signal indicative of the highest temperature measured by the sensor element over a predetermined time interval.

Preferably, a maximum relative temperature signal indicative of the signal indicative of the highest temperature measured by the sensor element is transmitted by the transmitter together with the measuring signal.

It is thereby possible to know not only the current temperature of the pin but also the highest temperature reached by the pin in a predetermined time interval.

Preferably, the memory module is also configured to store the signal indicative of the highest temperature ever measured by the sensor element.

Preferably, an absolute maximum temperature signal indicative of the signal indicative of the absolute highest temperature measured by the sensor element is transmitted by the transmitter together with the measuring signal.

It is thereby possible to know not only the current temperature of the pin but also the highest absolute temperature reached by the pin.

Preferably, the transmitter comprises an antenna and the sensor electronic module comprises a printed circuit board delimited by a peripheral edge, said antenna being mounted on the printed circuit board at the peripheral edge.

The Applicant has verified that such an antenna position is the one least affected by possible interference. Mounting the antenna on the printed circuit board reduces the complexity and space required for the sensor, so that it can be more easily housed inside the second cavity.

Preferably, the peripheral edge of the printed circuit board can be inscribed in a circumference having a diameter equal to or less than the diameter of the second cavity.

Thereby, the printed circuit board can be inserted in the second cavity with a reduced axial footprint.

Preferably, the peripheral edge of the printed circuit board comprises a rectilinear portion at which said antenna is arranged.

Thereby, the antenna is positioned in an area not close to a wall defining the second cavity, minimizing the shielding effect of the wall defining the second cavity.

Preferably, the rectilinear portion of the printed circuit board edge defines a chord for the edge of the printed circuit board.

Preferably, the sensor element comprises a thermistor arranged in contact with a wall of the second cavity.

Thereby, the thermistor measures exactly the temperature of the pin at the second cavity.

Preferably, the thermistor is a resistor whose electrical resistance value varies with the temperature.

Preferably, an identification ID code transmitted by said transmitter is associated with said sensor.

The identification code enables a sensor to be distinguished from the adjacent sensor arranged in the adjacent pin.

The ID code is preferably transmitted together with the measuring signals, so that the measuring signals can be associated with a specific ID.

When the sensors of the whole chain assembly are activated for the first time, a corresponding sensor can be associated to each ID. Preferably, each ID is associated to a relative position, so that each sensor is associated to a relative position within the chain assembly.

Such an association can be made by bringing a mobile phone terminal or portable device close to each joint and reading the emission intensity of the various IDs received. The ID signal with the highest intensity corresponds to the sensor in front of which the terminal was placed. By repeating the operation for an entire revolution of the track chain, it is possible to associate each sensor to a specific ID and a relative position.

Thereby, when the chain assembly is in use, a respective pin can be associated with each measuring signal received.

Alternatively, the terminal can be fixed on board the machine and arranged in a known position. As a function of the distance of the terminal from each sensor, it is further possible to receive IDs to which transmission intensities are associated. The higher transmission intensity is indicative of the pin closest to the fixed terminal. Also in this case, the operation of associating each ID to a corresponding pin can be carried out when the machine is first powered up.

BRIEF DESCRIPTION OF THE DRAWINGS

Further features and advantages of the invention will be more evident from the following description of a preferred embodiment thereof, made with reference to the appended drawings. In such drawings.

DETAILED DESCRIPTION

A track pin assembly in accordance with the present invention has been indicated by the number 10 in the accompanying figures.

The track pin assembly 10 can be used on work machines such as earth moving machines, mining machines, demolition machines, bulldozers and the like.

Such work machines comprise an undercarriage and an upper unit, usually rotatable in relation to the undercarriage, and provided with work tools (such as a bucket, digger arm, wrecking ball and the like). The undercarriage is configured to be able to move and maneuver autonomously on uneven, muddy or stony ground and on any terrain on which the work machine must operate.

Figure 1:
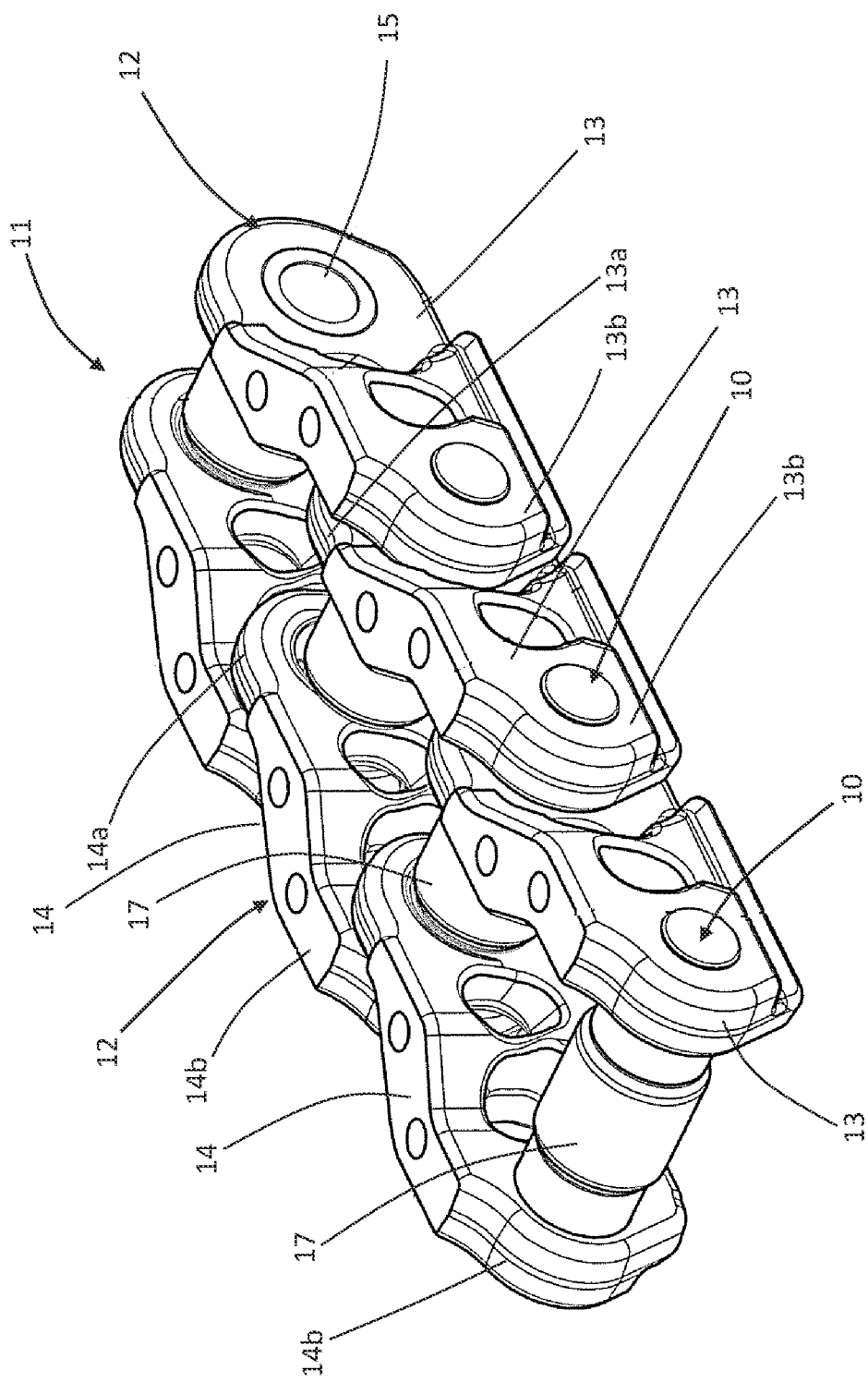
FIG. 1 is a perspective view of a track chain assembly part of a work machine in accordance with the present invention.

The undercarriage comprises two chain assemblies 11 (a portion of which is shown in FIG. 1) wound around respective sprocket and idler. Shoes are applied to each chain assembly 11 to come in direct contact with the ground and to discharge the traction to the ground to increase the contact surface between the machine and the ground. The type of shoe used depends on the ground on which the machine must operate, on the conditions of the environment in which the machine must operate and on the specifications suggested by the machine manufacturer.

As shown in FIG. 1, each chain assembly 11 comprises a plurality of joints 12 (three joints are shown in FIG. 1) interconnected at respective ends to form a structure closed thereon.

Each joint 12 comprises a pair of links 13, 14 in which a respective link 13, 14 of each joint 12 partially overlaps the link 13, 14 of an adjacent joint 12 (see FIG. 1).

In the overlapping area of two links 13, 14 an axially inner link 13a, 14a (also called inner link) and an axially outer link 13b, 14b (also called outer link) can be identified.

Each inner link 13a, 14a and outer link 13b, 14b comprises a pair of through holes 15 passing through the link. In the overlapping area of two links, the hole 15a of the inner link 13a, 14a is axially aligned with the hole 15b of the outer link 13b, 14b.

Each inner link 13a, 14a is connected to a respective outer link 13b, 14b by a track pin assembly 10.

The track pin assembly 10 comprises a pin 16 (better illustrated in FIG. 2), made of a metallic material such as steel, which inserts into the aligned holes 15 of the links of two joints 12.

Figure 2:
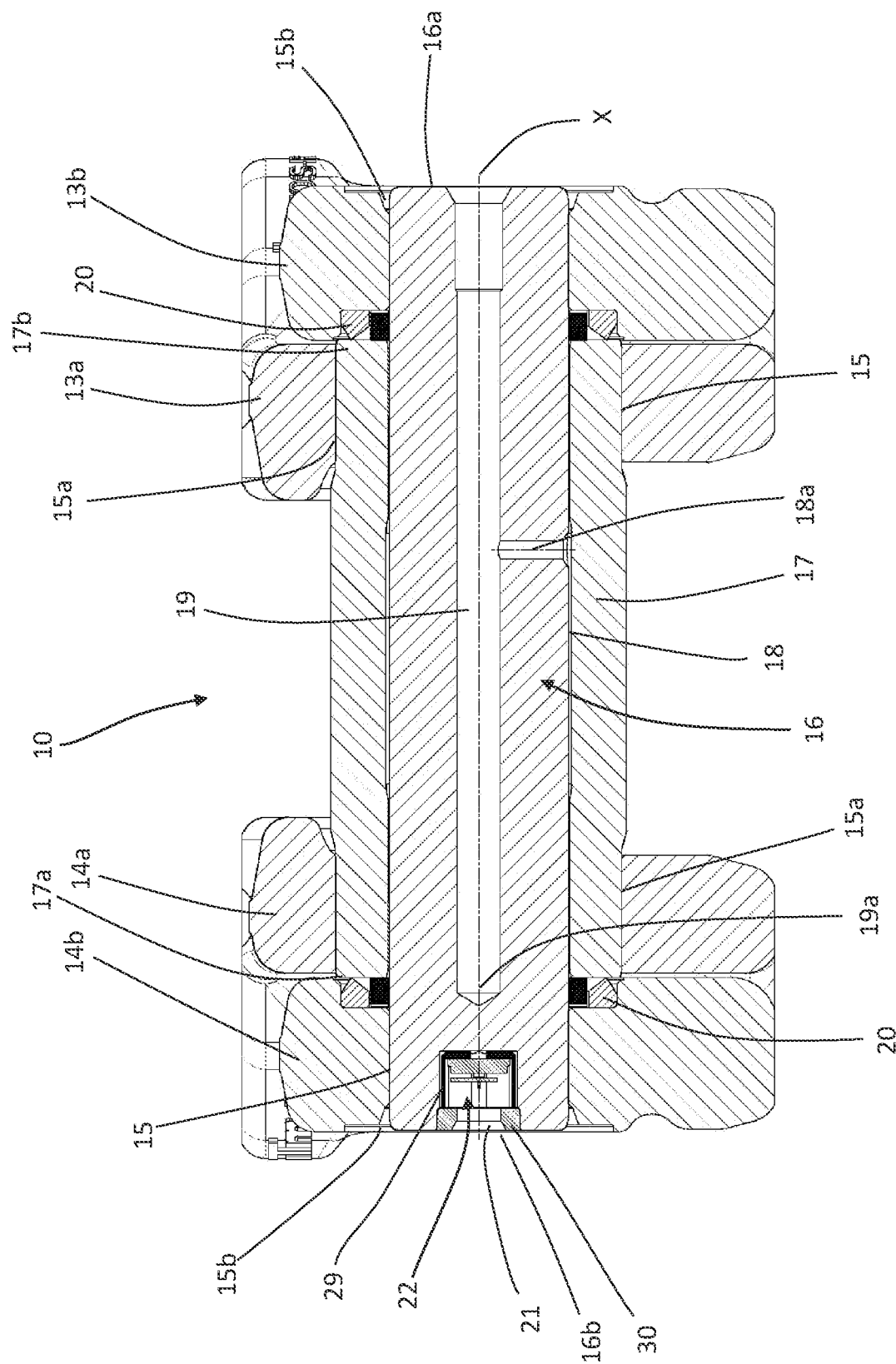
FIG. 2 is a sectional view of a joint of FIG. 1 comprising a track pin assembly in accordance with the present invention.

The pin 16 has a smaller outer diameter than the diameter of the holes 15a of the inner links 13a, 14a so that the inner links 13a, 14a are rotatable with respect to the pin 16. The diameter of the holes 15b in the outer links 13b 14b is smaller than the outer diameter of the pin 16, so that the pin 16 is firmly constrained to the outer links 13b 14b and cannot rotate with respect thereto. As illustrated in FIG. 2, the pin 16 extends in the axial direction up to the axial ends of the outer links 13b, 14b.

A bushing 17 is inserted in the holes 15a of the inner links 13a, 14a and has an outer diameter, at least at the inner links 13a, 14a, which is greater than the diameter of the holes 15a of the inner links 13a, 14a so that the bushing 17 is firmly constrained to the inner links 13a,14a and cannot rotate with respect thereto.

The pin 16 is inserted inside the bushing 17 so that the bushing 17 completely surrounds the pin 16 for a section of the pin 16 extending between the inner links 13a, 14a. Preferably, the bushing 17 surrounds the pin 16 up to the outer links 13b, 14b, as illustrated in FIG. 2.

The inner diameter of the bushing 17 is, at least in a central section of the bushing 17, slightly larger than the outer diameter of the pin 16, so that an annular chamber 18 is defined between the pin 16 and the bushing 17.

From the above, it is evident that the pin 16 can rotate around an axial axis with respect to the bushing 17.

In order to reduce the friction between the bushing 17 and the pin 16 and to lubricate the relative moving parts of the joint 12, a first cavity 19 is defined in the pin 16 which is arranged in fluid communication with the annular chamber 18 filled with lubricating oil or grease.

The first cavity 19 extends from a first axial end 16a of the pin 16 and is open at such a first axial end 16a to allow the first cavity 19 and the annular chamber 18 to be filled with lubricating oil or grease.

The first axial cavity 19 is blind, i.e., it does not reach the second axial end 16b of the pin 16 and ends with a bottom wall 19a arranged inside the pin 16 between the first 16a and the second 16b axial ends.

At the first axial end 16a, the first cavity 19 is closed, when in use, by a cap (not illustrated) which fluid-sealingly closes the first inner cavity 19.

A radial conduit 18a obtained in the pin 16 puts the first cavity 19 in fluid communication with the annular chamber 18.

In order to prevent the leakage of oil or grease between the bushing 17 and the outer links 13b, 14b, hydraulic seals 20 are provided interposed between the axial ends 17a, 17b of the bushing 17 and the outer links 13b, 14b. Such hydraulic seals 20 are designed to be accommodated in an undercut of the outer links 13b, 14b, so that the inner and outer links can be placed close to each other (see FIG. 2).

To allow to insert the pin 16 in the links 13, 14, a second open cavity 21 is provided at the second end 16b of the pin 16.

The second cavity 21 has a substantially axial-symmetric extension around a central axis X of the pin 16 extending axially.

The second cavity 21 is preferably blind i.e., it does not reach the first axial end 16a of the pin 16 and ends with an inner wall 21a arranged inside the pin 16 between the second 16b and the first 16a axial end.

The second cavity 21 usually has the function of receiving a centering tool which allows a press (or similar tool) to exert a direct axial force on the pin 16 to insert the pin 16 inside the holes 15 of the links 13, 14. In fact, the pin 16 is inserted into the holes 15b of the outer links 13b, 14b by mechanical interference.

A sensor 22 is inserted inside the second cavity 21 which is capable of detecting the temperature of the pin and transmitting it in order to be received by a device outside the track pin assembly 10.

In the preferred embodiment of the invention, the sensor 22 comprises a sensor element 23 configured to measure a temperature and to generate a signal indicative of the measured temperature.

The sensor element 23 is a thermistor configured to generate an electric signal that is representative of the measured temperature. For example, the thermistor 23 is a thermal probe, preferably an NTC (Negative Temperature Coefficient) probe having a negative temperature coefficient which causes a decrease in electrical resistance as the temperature increases. Preferably, the temperature transducer 23 is adapted to measure temperatures up to about 200° C.

The sensor element 23 is placed in direct contact with an inner wall 21a of the second cavity 21, so as to detect the temperature of the pin 16.

The sensor element 23 is operatively connected to a transmitter 24 entirely contained in the second cavity 21 and configured to irradiate a measuring signal representative of the signal generated by the sensor element 23.

A power source 25 is also entirely contained in the second cavity 21 and constantly supplies the sensor 22.

The sensor 22 further comprises a sensor electronic module 26 contained entirely inside the second cavity 21 configured to wirelessly generate measuring signals which include representative data of the temperature measured by the thermistor 23.

The sensor electronic module 26 and the thermistor 23 are electrically connected together by electric wires (not illustrated).

In an alternative embodiment of the invention, the sensor element 23 can be integrated in the sensor electronic module 26, for example integrated in a processor of the sensor electronic module 26. In this embodiment, the thermistor 23 is therefore not present.

The sensor electronic module 26 comprises circuit components operatively connected to electric wires to capture signals from the thermistor 23 and generate output electric signals representative of the measured temperature.

The circuit components of the sensor electronic module 26 comprise circuit components for the management of the signals from the thermistor 23, which can comprise a conditioning circuit for the analogue signals from the thermistor 23 and a possible amplifier for converting the input signals into a voltage or current, analogue or digital output signal. Typically, the electric signals output from the circuit components are digital electric signals. For this purpose, the circuit components can comprise an analogue-to-digital A/D signal converter.

The sensor electronic module 26 further comprises an electronic processor, in particular a microprocessor, associated with a memory which receives the measuring signals coming from the circuit components and stores them to later send them to a transmitter 24 for the wireless transmission of the measuring signals through an antenna 27.

The wireless transmitter 24 is configured to generate radio frequency signals. In particular, the wireless transmitter 24 is a radio frequency transmitter configured to receive measuring signals from the processor which include representative temperature data and to generate respective radio frequency (RF) signals which include representative temperature data. The wireless transmitter 24 is operatively connected to the antenna 27 for transmitting the RF signals.

The sensor electronic module 26 is configured to generate the measuring signals at predetermined time intervals. In the preferred embodiment of the invention, the measuring signals are generated every 10 seconds or so.

The sensor electronic module 26 is further configured to process the signals indicative of the temperature measured by the sensor element 23 at predetermined time intervals. In the preferred embodiment of the invention, the signals indicative of the temperature measured by the sensor element 23 are processed by the processor about every 1 minute.

The sensor electronic module 26 comprises a memory module configured to store the signal indicative of the highest temperature measured by the sensor element 23 over a predetermined time interval. Such a memory module can be of a rewritable type and contains information on the highest temperature measured by the thermistor 23 over a time interval of between about 24 hours and one week, for example three days.

The memory module is also configured to contain information about the absolute highest temperature measured by the thermistor 23.

The maximum temperature signal indicative of the highest temperature measured by the sensor element 23 in the predetermined time interval and the absolute maximum temperature signal indicative of the absolute highest temperature measured by the sensor element 23 are transmitted by the wireless transmitter 24 together with the current measuring signal.

Figure 3:
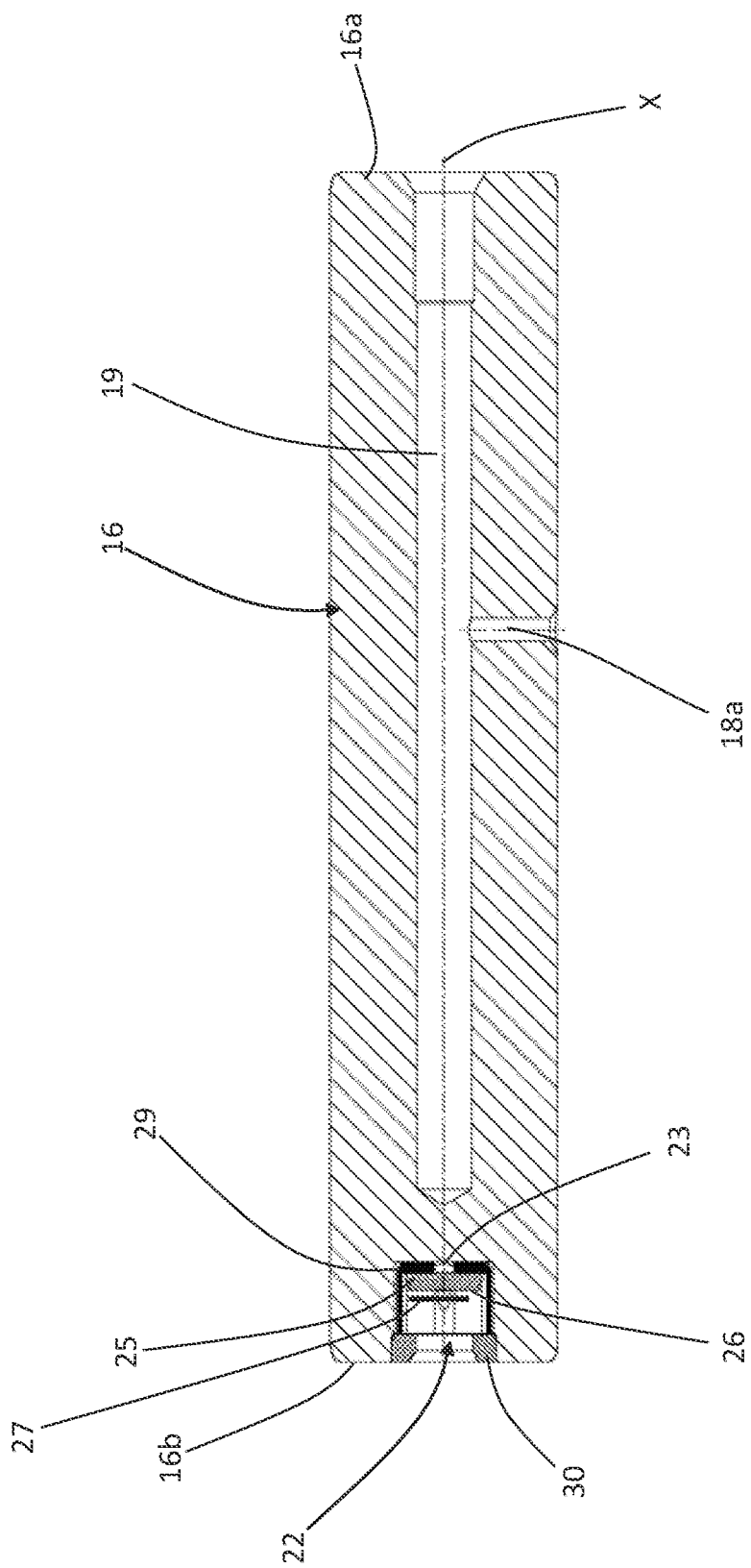
FIG. 3 is a sectional view of the track pin assembly of FIG. 2.
Figure 4:
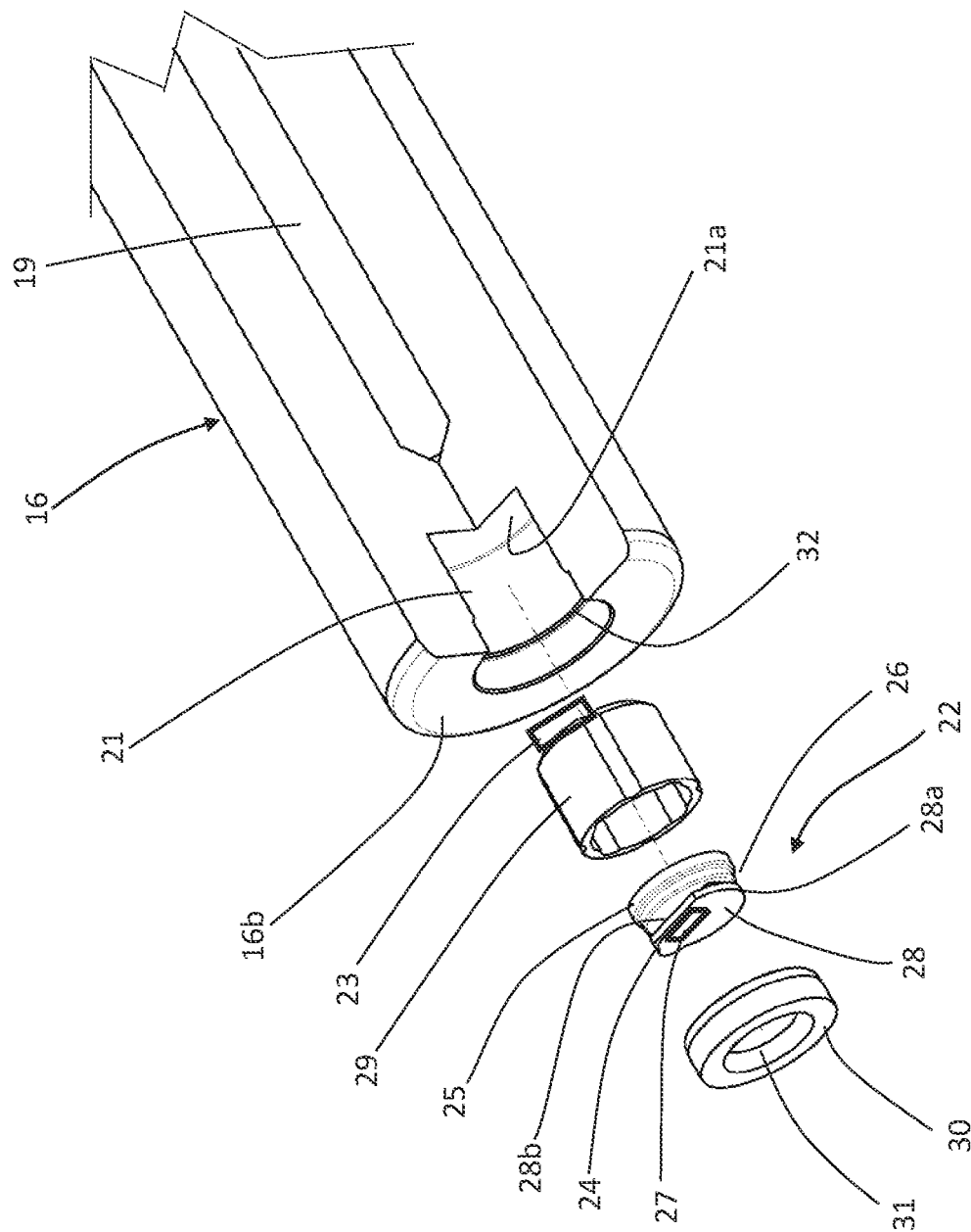
FIG. 4 is a partially sectional, perspective and exploded view of the track pin assembly of FIG. 2.

As illustrated in FIGS. 3 and 4, the sensor electronic module 26 comprises a printed circuit board (PCB) 28 on which the circuit components, electronic devices and the antenna 27 are mounted, so as to obtain a greater compactness of the sensor 23. The antenna 27 is a planar on-chip RF antenna for such a purpose.

As illustrated in FIG. 4, the printed circuit board 28 has a peripheral edge 28a which can substantially be inscribed in a circumference and has a rectilinear portion 28b defining a chord for such a circumference. The antenna 27 is mounted near said rectilinear portion 28a, and preferably in a median position along the rectilinear portion 28.

The antenna 27 is mounted on an axially outer surface of the printed circuit board 28. A power source 25 is associated with an axially inner surface of the printed circuit board. The latter is obtained by a button battery with a smaller diameter than the diameter of the second inner cavity 21.

The diameter of the circumference in which the peripheral edge of the printed circuit board is inscribed has a smaller diameter than the diameter of the second cavity 21, so that the entire sensor 22 can be contained in the second cavity 21 (as illustrated in FIG. 2).

As illustrated in FIG. 3, the sensor 22 is arranged inside a substantially cylindrical container element 29 which acts as a support and container for the sensor 22 and all of the components thereof. Once the sensor 22 is inserted in the container element 29, the latter can be filled with plastic or resin, embedding the sensor 22 and making it fluid-tight.

A centering ring 30 is arranged axially outside the sensor 22 and the housing element 29, which acts as an axial abutment for the sensor 22 and the housing element 22 and prevents them from moving in an axially outward direction.

The centering ring 30 also has the function of restoring the inner diameter of the second cavity 21, at least in a portion near the second end 16b of the pin 16, to a standard diameter useful for using a centering tool when inserting the pin 16 in the links 13, 14.

This allows the second cavity 21 to be arranged with an even larger diameter than the standard diameter for the use of a standard centering tool, in order to have more space in the radial direction to house the sensor 22. This allows, for example, to use standard-sized button batteries to supply the sensor 22. By way of example, the diameter of the hole 31 defined by the centering ring 30 can be about 15 millimeters and the diameter of the second cavity 21 can be between about 20 and about 30 millimeters, for example about 27 millimeters.

The outer diameter of the centering ring 30 is substantially equal to or slightly larger than the diameter of the second cavity 21 at the second end 16b of the pin 16 in order to be inserted in the second cavity 21 by mechanical interference.

As shown in FIG. 2, when the centering ring 30 is inserted in the second cavity 21, the centering ring 30 lies flush with the second axial end 16b of the pin 16, i.e., it does not exit the axial footprint of the pin 16.

For such a purpose, in order to stop the degree of insertion of the centering ring 30 in the second cavity 21, the second cavity 21 comprises a shoulder 32 arranged at an axial distance from the second end 16b of the pin 16 substantially equal to the thickness of the centering ring 30 in the axial direction. The shoulder 32 is obtained by a variation in diameter of the second cavity 21. In particular, the diameter of the second cavity 21 is greater near the second end 16b of the pin 16 and decreases, forming an annular step, at a distance from the second end 16b of the pin 16 substantially equal to the thickness of the centering ring 30 in the axial direction.

As shown in FIG. 2, the depth of the second cavity 21, i.e., the extension thereof in the axial direction, is much less than the depth of the first cavity 19. In the preferred embodiment of the invention, the depth of the second cavity is about 0.1 times the depth of the first cavity 19. The second cavity 21 is dry, i.e., it contains no fluids or lubricating oil. The second cavity 21 is not in fluid communication with the first cavity 19.

Preferably, the wireless transmitter 27 is configured to generate short-range radio signals, in particular with an action range of about 0.2 meters to about 2 meters. In a particularly preferred embodiment, the wireless transmitter 27 uses Bluetooth Low Energy (BLE) technology with low power consumption.

Preferably, the wireless transmitter 27 is configured to send the RF signals in connectionless broadcasting mode. As is generally known, in this mode the communication channel is unidirectional, without confirmation of message reception, so that the signals sent can be received by any listening device, or configured to receive signals in the same communication channel which is at a useful distance to receive them.

For example, the BLE communication channel is on the 2.4 GHz band.

Figure 5:
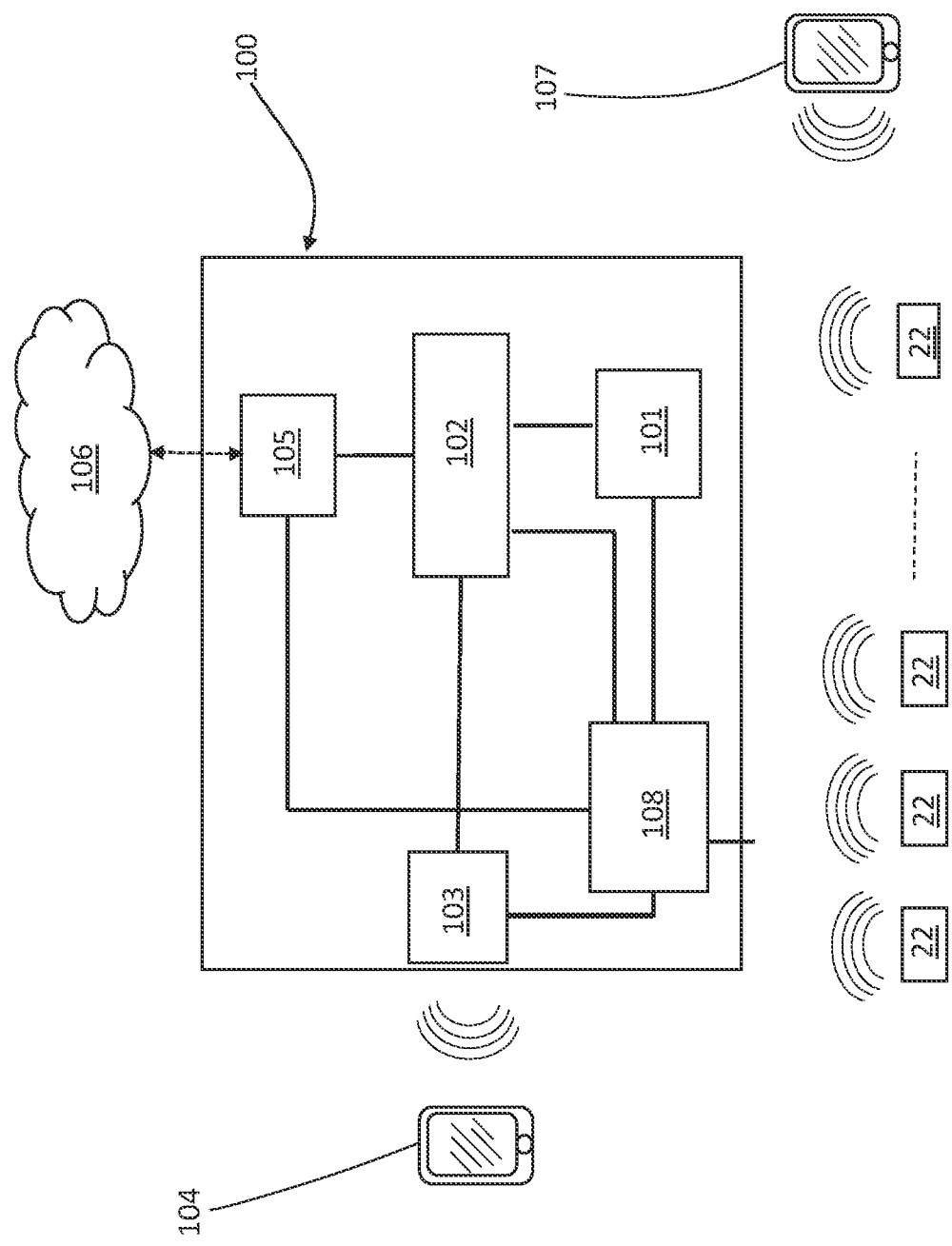
FIG. 5 is a schematic view of a temperature monitoring system applied to the track pin assembly of FIG. 2 in accordance with the present invention.

Referring to FIG. 5, a temperature monitoring system of the track pin assembly 10 comprises a gateway 100 in wireless communication with the sensor 22. For this purpose, the gateway 100 comprises a gateway wireless transceiver 101 configured to receive the radio signals from the sensors 22 of a plurality of pin assemblies 10 mounted on the chain assembly.

In embodiment examples, the BLE signals transmitted periodically by the plurality of sensors 22 are received by the gateway wireless transceiver 101 and transmitted to a central processing unit 102, for example a microcontroller. The central processing unit 102 typically comprises a non-volatile memory, on which the measuring signals received by the gateway wireless transceiver 101 are stored.

The gateway 100 comprises a wireless access point 103 configured to act as an entry point to the data related to the measuring signals which are stored in the central processing unit 102. The measuring signals, possibly in the form of data packets, transmitted by each sensor 22 are received by the gateway transceiver 101 which is configured to transmit them to the central processing unit 102. The latter, upon receiving the measuring signals, transmits them to the wireless access point 103.

The wireless access point 103 is configured to generate medium range wireless signals, in particular with an action range of about 20 meters to about 500 meters.

Preferably, the wireless access point 103 is configured to generate Wi-Fi radio signals, for example in accordance with the standard IEEE 802.11 communication protocols. The range covered by the Wi-Fi signals can be 100-150 meters in the outdoor environment, in a typical use when the gateway is installed in or near the work machine.

Any client terminal 104 provided with Wi-Fi connectivity, for example a smartphone, tablet or PC, can connect to the Wi-Fi access point 103, which acts as a hotspot, by means of a known authentication procedure and request the access to the data related to the measuring signals stored in the central processing unit 102 of the gateway 100.

The central processing unit 102 can be in communication with a wireless communication module for transmitting the measuring signals received by the gateway wireless transceiver 101 to a remote server or terminal via a mobile telecommunication network. Preferably, the gateway 100 comprises a mobile connection module 105 for the connection with a mobile telecommunication network 63 (2G, 3G, 4G, LTE . . . ). The mobile connection module 105 is in particular a cellular wireless modem which typically integrates a SIM card which includes the user identification code. The central processing unit 102 is operatively connected to the cellular wireless modem 105.

Through a cellular telecommunication network 106, the measuring signals can be transmitted from the module 105 to a remote server or to the mobile terminal of an operator arranged at any distance from the measurement site.

The measuring signals transmitted by the mobile connection module 58 can be received remotely by a server and for example displayed by an operator.

The gateway 100 is arranged near the track chains, at a distance therefrom such as to allow the reception of the measurement signals by the gateway 100. The distance generally depends on the wireless communication technology and the power of the signals emitted. The gateway 100 can be arranged inside a vehicle mounted on the undercarriage. In an embodiment, the electronic devices of the gateway are supplied with current by a power supply module 108 by means of electrical lines.

Alternatively or in combination with the gateway, the measuring signals transmitted by the sensors 22 can be received by a mobile terminal or portable device 107, which is arranged near the undercarriage track chain.

Each sensor 22 is associated with an ID code transmitted by the transmitter 27. The ID codes are stored in the central processing unit 102 or directly in the mobile terminal or portable device 107.

In order to associate each sensor 22, and therefore each track pin assembly 10 with the corresponding ID and thus associate the measuring signals with the correct sensor 22, upon the first activation of the sensors 22 of the entire chain assembly, each ID is associated with a relative position inside the chain assembly.

Such an association can be made by approaching the mobile terminal or portable device 107 to each joint 12 and reading the emission intensity of the various IDs received. The ID signal with the highest intensity corresponds to the sensor in front of which the terminal 107 was placed. By repeating the operation for an entire revolution of the track chain, it is possible to associate each sensor to a specific ID and a relative position.

Alternatively, the wireless gateway transceiver 101 receives the ID signals transmitted by the sensors 22 and, knowing the position of the transceiver 101 and the strength of the signal received by each sensor 22, it is possible to associate the ID signal with the highest strength with the sensor 22 of the track pin assembly 10 closest to the gateway wireless transceiver 101.

In both cases, once the association between ID and corresponding sensor 22 has been made, such information is stored so that it is always available to associate the temperature signal received with the correct sensor 22.

At regime, when a temperature signal is received which exceeds a preset threshold or which exceeds the temperature signal of the other sensors 22 by about 10° C. or 15° C., it is possible to intervene in real time to check the actual operating status of the corresponding track pin assembly 10.

If the temperature signal of a sensor 22 is not read, it is once again possible to intervene in real time to check the actual operating status of the corresponding track pin assembly 10.

In other words, the failure of a sensor 22 to receive a temperature signal is unambiguously attributable to a malfunctioning state of the sensor 22 or the track pin assembly 10, thus obtaining a fail-safe monitoring system.

The monitoring system thus allows the management of measuring signals from a plurality of sensors 22 in the chain assembly in real time.

The present invention has been described with reference to some preferred embodiments thereof. Various modifications can be made to the embodiments described above, still remaining within the scope of protection of the invention, defined by the following claims.

The invention claimed is:

1. A track pin assembly comprising:
a pin comprising a first axial end and a second axial end configured to engage a respective outer link of a joint, a first cavity which defines a tank for containing lubricating oil or grease, wherein the first cavity is open at the first axial end and extends axially towards the second axial end, wherein the first cavity is blind, and a second cavity fluidly separated from said tank, arranged at the second axial end of the pin and open at the second axial end of the pin, wherein the second cavity is blind;
a sensor arranged in the second cavity and comprising a sensor element, configured to measure a temperature and to generate a signal indicative of the measured temperature, and a transmitter configured to irradiate a measuring signal that is representative of the signal generated by the sensor element; and
a power source configured to supply the sensor and arranged in the second cavity.

2. The track pin assembly according to claim 1, comprising a centering ring arranged in the second cavity in an outer axial position with respect to the sensor and to the power source; said centering ring reducing the radial dimension of the second cavity at the second axial end of the pin.

3. The track pin assembly according to claim 1, wherein the transmitter comprises an antenna completely arranged inside the second cavity.

4. The track pin assembly according to claim 1, wherein the sensor comprises a sensor electronic module operatively connected to the sensor element and to the transmitter to process the signals indicative of the temperature measured by the sensor element and to generate the measuring signals; said sensor electronic module being arranged inside the second cavity and being constantly supplied by said power source.

5. The track pin assembly according to claim 4, wherein the sensor electronic module is configured to generate the measuring signals at predetermined time intervals.

6. The track pin assembly according to claim 4, wherein the sensor electronic module is configured to process the signals indicative of the temperature measured by the sensor element at predetermined time intervals.

7. The track pin assembly according to claim 4, wherein the sensor electronic module comprises a storage module configured to store the signal indicative of the highest temperature measured by the sensor element in a predetermined time interval and to store the signal indicative of the maximum temperature ever measured by the sensor element.

8. The track pin assembly according to claim 4, wherein the transmitter comprises an antenna and wherein the sensor electronic module comprises a printed circuit board delimited by a peripheral edge; said antenna being assembled on the printed circuit board at the peripheral edge.

9. The track pin assembly according to claim 8, wherein the peripheral edge of the printed circuit board can be inscribed in a circumference having a diameter equal to or lower than the diameter of the second cavity; the peripheral edge comprising a rectilinear portion at which said antenna is placed.

10. The track pin assembly according to claim 1, wherein the sensor element comprises a thermistor arranged in contact with a wall of the second cavity.

11. The track pin assembly according to claim 10, wherein the thermistor is a resistor whose electrical resistance value varies with the temperature.

12. The track pin assembly according to claim 1, wherein said sensor is associated to an identification code ID transmitted by said transmitter.

13. A track pin assembly comprising:
a pin comprising a first axial end and a second axial end configured to engage a respective outer link of a joint, a first cavity which defines a tank for containing lubricating oil or grease, and a second cavity, arranged at the second axial end of the pin and open at the second axial end of the pin;
a sensor arranged in the second cavity and comprising a sensor element, configured to measure a temperature and to generate a signal indicative of the measured temperature, and a transmitter configured to irradiate a measuring signal that is representative of the signal generated by the sensor element;
a power source configured to supply the sensor and arranged in the second cavity; and
a centering ring arranged in the second cavity in an outer axial position with respect to the sensor and to the power source, said centering ring reducing the radial dimension of the second cavity at the second axial end of the pin.

14. A track pin assembly comprising:
a pin comprising a first axial end and a second axial end configured to engage a respective outer link of a joint, a first cavity which defines a tank for containing lubricating oil or grease, and a second cavity, arranged at the second axial end of the pin and open at the second axial end of the pin;
a sensor arranged in the second cavity and comprising a sensor element, configured to measure a temperature and to generate a signal indicative of the measured temperature, and a transmitter configured to irradiate a measuring signal that is representative of the signal generated by the sensor element; and
a power source configured to constantly supply the sensor and arranged in the second cavity;
wherein the sensor comprises a sensor electronic module operatively connected to the sensor element and to the transmitter to process the signals indicative of the temperature measured by the sensor element and to generate the measuring signals, said sensor electronic module being arranged inside the second cavity and being supplied by said power source;
wherein the transmitter comprises an antenna and wherein the sensor electronic module comprises a printed circuit board delimited by a peripheral edge, said antenna being assembled on the printed circuit board at the peripheral edge.

15. The track pin assembly according to claim 14, wherein the peripheral edge of the printed circuit board can be inscribed in a circumference having a diameter equal to or lower than the diameter of the second cavity, the peripheral edge comprising a rectilinear portion at which said antenna is placed.

* * * * *